United States Patent [19]

Gamblin

[11] Patent Number: 4,773,932

[45] Date of Patent: Sep. 27, 1988

[54] LOW RUB OFF PRINTING INKS

[75] Inventor: Rodger L. Gamblin, Dayton, Ohio

[73] Assignee: Saranda Consolidated Limited Partnership, Dayton, Ohio

[21] Appl. No.: 31,405

[22] Filed: Mar. 27, 1987

[51] Int. Cl.$^4$ ...................... C09D 11/02; C09D 11/06
[52] U.S. Cl. ........................................ 106/23; 106/27; 106/28
[58] Field of Search ................ 106/27, 28, 23, 273 R

[56] References Cited

U.S. PATENT DOCUMENTS

| | | | |
|---|---|---|---|
| 7,686 | 10/1850 | Mathews | 106/23 |
| 53,379 | 3/1866 | Sangster et al. | 106/27 |
| 375,720 | 1/1888 | Bailey | 106/22 |
| 1,201,994 | 10/1916 | Acheson | 106/30 |
| 1,738,798 | 12/1929 | Richter et al. | 106/27 |
| 2,346,970 | 4/1944 | Jones | 106/31 |
| 2,392,376 | 1/1946 | Goepfert | 106/23 |
| 2,416,676 | 4/1947 | Bernardi et al. | 106/29 |
| 2,580,205 | 12/1951 | Voet | 106/23 |
| 4,107,327 | 8/1978 | Tilson et al. | 428/304 |
| 4,197,221 | 4/1980 | Eisenmenger et al. | 260/16 |
| 4,383,860 | 5/1983 | Uhlemayr et al. | 106/27 |
| 4,419,132 | 12/1983 | Moynihan | 106/27 |
| 4,519,841 | 5/1985 | Moynihan | 106/27 |
| 4,554,019 | 11/1985 | Moynihan | 106/27 |

OTHER PUBLICATIONS

*Chemical Abstracts*, vol. 92, No. 2, Feb. 20, 1978, Abstract No. 7989N, Shimodaira et al., "Lithographic Printing Inks with Relatively Low Viscosity".

*Primary Examiner*—Paul Lieberman
*Assistant Examiner*—Christine A. Skane
*Attorney, Agent, or Firm*—Donald E. Degling

[57] ABSTRACT

A printing ink comprising pigment, oil, tall oil pitch, and optionally, Gilsonite.

6 Claims, No Drawings

LOW RUB OFF PRINTING INKS

Offset printing generally produces higher quality images on newsprint than letterpress printing because (a) offset printing is planographic (the character and background structure areas on the printing plate are at the same height); and (b) in offset printing the ink is applied by means of a conformable rubber cylinder. With offset printing the ink is relatively gently applied to the surface of the paper by this conformable rubber cylinder and thus tends to rub off to a great extent. This problem is particularly severe in the case of newspapers printed with offset printing presses because of the nature of the ink generally used to print newspapers. On the other hand, images produced by offset printing appear to have stronger colors when colored ink is used and are darker when black ink is used.

Although a letterpress printing press strikes the surface of the paper with greater force than an offset printing press, newspapers printed with conventional newspaper inks on letterpress printing presses are also subject to rub off. In an attempt to improve the appearance of letterpress printing, letterpress printers have been applying ink films to newsprint that are heavier than the ink films previously used. The use of such heavy ink films exacerbates the tendency of the ink to be rubbed off when the newspaper is handled by the reader.

So called "low-rub" inks have been developed that eliminate approximately 50% of the rub off generally experienced with conventional newspaper inks. However, such inks are generally significantly more expensive than conventional inks.

I have developed a novel low-rub ink, useful as a letterpress or offset ink, that reduces rub off to an extent that is significantly lower than the rub off generally associated with conventional newspaper inks, and, surprisingly, costs about the same as or less than conventional newspaper inks.

The pigments used to provide color to an ink or to make an ink black are generally very fine powders that are not soluble in the vehicle or liquid portion of the ink. In order for a pigment to be satisfactory in an ink vehicle it must be wet by the vehicle and must also develop either an electrical charge or steric hinderances so that the wetted particles stay apart from each other until the ink is printed. A pigment so separated is said to be dispersed. The inks of the present invention have superior dispersing properties as compared to conventional inks since they may be ground rapidly and completely using only high shear dispersing equipment.

The inks of the present invention also have excellent printability and do not cause pipe roller buildup as do the inks that are currently made for use as low rub off inks. The term printability refers to the general quality of the ease of use of the ink on conventional printing equipment. Thus on an offset printing press, printability depends upon factors such as the uniformity of color of the printed matter, the sharpness of the halftone dots, a lack of fill-in in halftones, and the ease of balancing the water with the ink in the system. The inks of the present invention resist toning or scumming (a tendency to print in the background), have good water balance, do not mist on the press, have sharp halftone reproduction, have superior lay down (uniformity of the printed matter), and, of course, resist rub off. With letterpress printing the inks of the present invention do not mist, have good laydown, and do not cause fill in of halftone dots.

The ink of my invention comprises pigment, an oil, tall oil pitch and preferably also comprises Gilsonite. As used herein, unless indicated otherwise, the term tall oil pitch includes oxidized tall oil pitch and mixtures of tall oil pitch and oxidized tall oil pitch. Preferably, the tall oil pitch used in the inks of the present invention is oxidized tall oil pitch.

In a preferred embodiment, the ink of my invention comprises 10 to 25 parts by weight of pigment, 10 to 70 parts by weight of oil, 15 to 60 parts by weight of tall oil pitch and 0-15% Gilsonite.

More preferably, the ink of my invention comprises 12 to 20 parts by weight of pigment, 30 to 60 parts by weight of oil and 20 to 35 parts by weight of tall oil pitch. Preferably, the tall oil pitch has been oxidized by blowing air through the pitch while hot (95°-130° C). Preferably, the ink also comprises 3-15 parts by weight of Gilsonite. The oxidized tall oil pitch in the ink of the present invention is capable of wetting the pigments generally used in printing inks (e.g., carbon black). It is, therefore, generally unnecessary to use any additional wetting agent in the inks of the present invention.

Gilsonite (uintaite) is a relatively high melting point (135° to 205° C.) mineral hydrocarbon resin mined in Utah. It is a wetting agent for carbon black in oil but more importantly in the present instance it acts to harden tall oil pitch so as to both coat the carbon black in the ink and maintain its dispersion, but yet help hold the carbon black together and on the paper after printing. The oil in the ink tends to absorb into the paper after printing. The pitch by itself imparts low rub characteristics (60-70% that of a conventional ink) but with Gilsonite, rub off as low as 10% that of a conventional ink can be achieved.

An ink which is superficially similar to that of the present invention is disclosed in U.S. Pat. No. 4,419,132 (the '132 patent). The '132 patent relates to inks wherein carbon black (a pigment), Gilsonite and tall oil fatty acids are used to make a printing ink for newspapers that is safe and exhibits enhanced viscosity flow and penetration characteristics. The ink of the '132 patent is directed to the problem of limiting rub off in a particular manner. In contrast to the tall oil fatty acid of the '132 patent, the tall oil pitch used in the present invention is a residual product (after removal of tall oil fatty acids and rosin acids) consisting of roughly one third rosin acids, one third fatty acids and one third unsaponifiables (higher alcohols, hydrocarbons, sterols and so forth). The rosin and fatty acids tend to be dimerized. Pitch is very different in tack, viscosity, color and melting point from tall oil fatty acids and, further, fatty acids cannot be substituted for the pitch of my invention and still achieve low rub off. Moreover, the '132 patent teaches the use of 16 to 25% Gilsonite (uintaite) while with my invention these values are too high to achieve an ink with proper characteristics.

In addition to pigment, oil and tall oil pitch, and Gilsonite, the inks of my invention may also contain other pigment wetting agents (also referred to as dispersing agents), ethyl cellulose, wax compounds, gelling agents or other conventional ink ingredients.

Generally, most conventional pigments used for printing inks are suitable for the inks of the present invention. Examples of pigments that may function as the pigment component of the present invention are iron oxides. A preferred pigment that is suitable for use in the inks of the present invention is carbon black. Generally, almost any printing ink grade carbon black may be used for preparing black ink. Elftex ® 8, a brand of carbon black sold by Cabot Corporation of Boston, Mass. is an especially preferred carbon black.

The oil component of the inks of the present invention may consist of a single oil or may be a mixture of oils. The oil should preferably have a boiling point range of about 220° to about 300° C. More preferably, the lower limit of the boiling point range is not less than about 230° C. It is also desirable that the oil be non-toxic and non-carcinogenic. Preferably, a conventional ink oil that is used in an ink of the present invention should first be hydrotreated and solvent extracted so that it is free from carcinogens.

Generally, most conventional ink oils, may be used in the inks of the present invention. Examples of oils that may function as the oil component of an ink of the present invention include mineral oil (e.g., paraffin oil), vegetable oils (e.g., low melting glycerides of fatty acids (e.g., a fat or triglyceride such as soybean oil), and rosin oil. An example of a suitable mixture of oils is a combination of mineral oil and vegetable oil. Examples of suitable mineral oils are the oils sold as Exxon Telura 343, Exxon SC 150, Exxon Telura 323, and Exxon Telura 521, available from Exxon Corporation; Sun HP-100, HP-60 and HP-40, available from Sun Refining and Marketing Company of Philadelphia, Pa.; and Witco 471 and Witco 50, available from Witco Chemical Corporation, Sonneborn Division, New York, N.Y.

A preferred oil is bodied linseed oil. The term "bodying" refers to a procedure whereby an oil is heated to a high temperature until cross linking takes place so as to thicken the oil to an extent so as to give proper body to an ink. With the formulations of this invention only a light degree of bodying is required in most cases since the tall oil pitch is an efficient thickening agent.

When mineral, vegetable, or rosin oils are used as the oil component of an ink of the present invention, drying of the inks occurs by absorption. While not intending to be bound by theory, it is believed that the tall oil pitch component of the inks in conjunction with the Gilsonite of the present invention not only wets the pigment but also coats it such that after printing when the oil has penetrated into the substrate and away from the pigment, the combination of pigment and pitch left on the surface resist rub off.

Gilsonite is a suitable dispersing agent that may be included in the inks of the present invention. In additon, Gilsonite, being a hard resin also hardens tall oil pitch when used at a rate of one or more parts by weight of Gilsonite to ten parts by weight of pitch. Thus, if five parts by weight of Gilsonite is added to an ink containing 35 parts by weight of tall oil pitch, 20 parts by weight of carbon black and 40 parts by weight of HP-60 (available from Sun Refining & Marketing Company), the ink has only 20% of the rub off of a conventional ink.

Tall oil pitch is a by-product of the manufacture of Kraft paper. In the Kraft process, wood chips, usually southern pine, are subjected to the action of an aqueous solution of sodium sulfide and sodium hydroxide. This combination extracts the lignin, hemicellulose and fat portions of the wood and leaves cellulose, which is suitable for making paper. When the solution (the so-called black liquor) that remains after the cellulose is separated is treated with sulfuric acid, a material referred to as crude tall oil rises to the top and may be skimmed off. Crude tall oil consists of rosin, dimerized rosin, tall oil fatty acids, dimerized fatty acids and certain unsaponifiable materials. Crude tall oil may be refined by vacuum distillation to separate tall oil rosin and tall oil fatty acids.

The high boiling residual left after most of the fatty acids and rosin are extracted from crude tall is called tall oil pitch. Tall oil pitch contains roughly equal amounts, by weight, of long chain mostly dimerized fatty acids, mostly dimerized rosin acids and unsaponifiables. Tall oil pitch has found limited usage because of its odor and lack of compatibility with other substances. The oxidation process used to prepare the oxidized tall oil pitch used in the inks of the present invention eliminates most, if not all, of the objectionable odor of the tall oil pitch.

In order to prepare the oxidized tall oil pitch that is used by the inks of the present invention, tall oil pitch may be oxidized in a number of ways, including blowing with air, oxidizing with hydrogen peroxide, or reacting with various oxygen containing compounds such as cumune hydroperoxide, acetyl peroxide, benzoyl peroxide or aqueous solutions of various oxidants such as sodium dichromate, chromic acid, the quaternary ammonium salt of chromic acid, potassium permangamate, sodium persulfate and the like. Oxygen and ordinary air may also be used in conjunction with metallic catalysts such as cobalt, lead, iron and manganese.

A preferred method of oxidizing tall oil pitch is to mix approximately 2% by weight, based on the weight of the tall oil pitch, of 35% hydrogen peroxide with tall oil pitch at approximately 70° C. and slowly raise the temperature to approximately 105° C. and hold until all bubbling ceases. At this point the pitch is generally ready for use, though further decolorization and deodorization can be achieved by adding an additional 2% by weight of 35% hydrogen peroxide and continuing the process.

Of the foregoing oxidants the use of hydrogen peroxide is preferred because it is inexpensive and leaves no contaminant in the resulting deodorized product since the hydrogen peroxide decomposes into oxygen and water. Sodium hypochlorite leaves salt which precipitates from solution and makes it more difficult to clean the reaction container after the deodorization has occured. Benzoylperoxide leaves a relatively harmless product in the reaction mixture, that is benzoic acid; however, benzoyl peroxide is somewhat expensive. Cumene hydroperoxide is relatively inexpensive; however, after it performs its oxidative function it tends to leave the odor of cumene in the product which, though less objectionable than the original odor, is not particularly desirable. Oxidation with air in the presence of a catalyst is highly effective, however, the oxidant catalysts, including cobalt, managanese, and lead, tend to preclude uses of the deodorized product that are sensitive to the presence of these relatively toxic materials. The use of iron, since it is relatively non-toxic, is not precluded; however, the iron imparts a color to the final product. This may be undesirable if the deodorized tall oil pitch is to be used for a colored ink rather than for black ink. Phase transfer salts such as the quarternary ammonium salt of materials such as permanganate, dichromate, or chromates are relatively inexpensive and though effective, also leave manganese or chromium ions in the product which may be objectionable for some applications.

Sodium chlorite is especially effective in complete deodorization, but, as with sodium hypochlorite, an objectionable by-product is salt. Chlorine dioxide may be generated and bubbled through tall oil pitch in order to deodorize it. This process tends to leave no residue and is effective; however, the use of the gas, chlorine dioxide, is less convenient than the use of the liquid hydrogen peroxide solution. An advantage, however, is that since hydrogen peroxide comes as an aqueous solution, the water must be removed by distillation from the tall oil product, whereas with chlorine dioxide it need not be so removed.

The most preferred method of oxidizing tall oil pitch is to merely heat it to 95°–130° C. and blow air through it until there is no odor. At 95° C., it will generally be necessary for air to be blown through the pitch for about one hour. However, at 130° C. it will generally be necessary to blow air through the pitch for only about a few minutes.

Using the methods described above, tall oil heads or other products of the tall oil refining process may be similarly deodorized.

Tall oil pitch is a natural product that is derived from various species of trees and from processes that vary from manufacturer to manufacturer. Generally, however, the material is sticky, highly viscous, dark brown and odoriferous. It becomes sharply less viscous at about 50°–60° C. and is fully miscible with aromatic solvents but not totally soluble in aliphatic solvents such as heptane at room temperature. The fraction not soluble in heptane is about 15–30% of the weight of the pitch. When the pitch is oxidized, the sharpest, most obnoxious odor is destroyed first. Thus with 10 psi air blown through a ½ inch opening in a container holding 12.5 gallons (100 pounds) of pitch at 105° C., the harshest odor is destroyed in about ½ hour, becoming a pure smell that in time is mostly gone after about 1 hour. Under these conditions (i.e., about 1 hour) I observe that the fraction insoluble in heptane amounts to about 5% of the total weight of the pitch. It is probably not worthwhile to attempt to track the precise chemical events recurring in a natural product such as pitch when "blowing" as above, but as in the case of "blowing" linseed oil, dimers and trimers are being formed, presumably through free radical interactions between unsaturated portions of the various fractions in the pitch. The extent to which we carry the oxidation is determined by detection of an absence of odor and, more preferably, until 18 percent by weight of carbon black will disperse in 82 percent by weight of a 70:30 mixture of the pitch and HP-40 oil (from Sun Refining and Marketing).

The extent of deodorization required is determined by the ink printing process. Generally, little or no odor is a requirement.

To prepare an ink of the present invention, tall oil pitch or oxidized tall oil pitch is combined with an oil and Gilsonite and carbon black or another pigment is added. The mixture is then ground in a conventional shot mill or in other mixing equipment suitable for the dispersion of pigments.

The following non-limiting Examples illustrate the preparation of inks of the present invention.

EXAMPLES

Example 1

2 grams of a 35% solution of hydrogen peroxide were added to 100 grams of tall oil pitch while heating. Stirring was commenced after the pitch reached a temperature of 60° C. The temperature was then slowly raised by heating. At approximately 100° C., the material began to foam. Heating was continued to about 140° C. At that temperature, the foaming soon ceased, and it was found, after the mixture was cooled, that the tall oil pitch had been almost completely deodorized.

Examples 2

100 grams of tall oil pitch were melted and stirring commenced at 60° C. 4 grams of benzoyl peroxide were added and heating continued until a temperature of approximately 130° C. was reached. It was found, after the mixture was cooled, that the pitch product had been almost completely deodorized.

Example 3

100 grams of tall oil pitch were heated and stirring commenced at approximately 60° C. 4 grams of 80% cumene hydroperoxide were than added and the material was stirred and heated to 140° C. It was found, after the mixture was cooled, that the material had been almost completely deodorized, though there was some odor of cumene associated with the product.

Example 4

100 grams of tall oil pitch were heated to 60° C., 10 grams of a 20% solution of sodium chlorite in water were added and the mixture was heated to 140° C. while stirring. When all gas evolution ceased, the product was found to have been almost completely deodorized, though there was some residue of salt after the product had been poured off.

Example 5

100 grams of tall oil pitch were heated to 60° C., stirring was commenced and 5 grams of cetyl trimethylammonium bromide were added. To this material were added 4 grams of sodium dichromate in 10 grams of water and stirring continued while heating to 140° C. until all gas evolution had ceased. The resulting material was somewhat discolored and a residue, presumably of sodium bromide and chromic oxide, was left in the beaker. The resulting material was free from odor.

Example 6

One hundred pounds of tall oil pitch were added to a stainless steel reaction vessel and heated to 105° C. with stirring. Air, at 10 psi, was introduced at the bottom of the reactor through a 0.5 inch diameter opening. After one hour the odor of the pitch had been completely removed.

Example 7

One hundred pounds of tall oil pitch were added to a stainless steel reaction vessel and heated to 130° C. with stirring. Air, at 10 psi, was introduced at the bottom of the reactor through a 0.5 inch opening. The pitch was completely deodorized in 10 minutes.

Example 8

Forty five pounds of deodorized tall oil pitch, twenty pounds of Elftex ® 8 carbon black from Cabot Corporation of Boston, Mass., and thirty five pounds of HP-60 oil from Sun Refining and Marketing Company were mixed together and dispersed in a laboratory shot mill. The resulting ink ran well on a Harris Cottrell V-15A printing press and had half of the rub off of a conventional ink as determined by the standard rub off test of the American Newspaper Publishers Association (ANPA) of Reston, Va.

Example 9

3 pounds of Gilsonite from American Gilsonite Company of Salt Lake City, Utah were melted in a mixture of 25 pounds of deodorized tall oil pitch along with 60 pounds of Sun Oil Company HP-60 at about 110° C. This material was then charged with 12 pounds of Elftex ® 8 carbon black and the mixture dispersed in a laboratory ball mill for approximately 12 hours so as to achieve a fine dispersion of carbon black. The mixture was cooled and found to have a tack of 5 as determined as a standard inkometer test as developed by the Graphics Arts Technical Foundation of Pittsburg, Pa. This ink was found to exhibit only 10% of the rub off of a standard newspaper ink as determined by the ANPA rub off test.

Example 10

18 grams of Gilsonite were melted in a mixture of 160 grams deodorized tall oil pitch and 150 grams HP-100 ink oil at 110° C. and mixed with 172 grams of Elftex ® 8 carbon black and the mixture ground in a laboratory high speed disperser. The resulting ink had a tack of 7.

I claim:

1. A low rub-off printing ink comprising 10 to 25 parts by weight of pigment, 10 to 70 parts by weight of oil and 20 to 60 parts by weight of tall oil pitch, wherein the tall oil pitch is oxidized tall oil pitch.
2. An ink according to claim 1, said ink comprising 12 to 20 parts by weight of pigment, 30 to 60 parts by weight of oil and 25 to 35 parts by weight of oxidized tall oil pitch.
3. An ink according to claim 2, said ink also comprising 5 to 15 parts by weight of Gilsonite.
4. An ink according to claim 1, said ink also comprising Gilsonite.
5. An ink according to claim 1, wherein said pigment is carbon black.
6. An ink according to claim 2, wherein said pigment is carbon black.

* * * * *